(12) United States Patent
Crooks

(10) Patent No.: US 9,836,679 B2
(45) Date of Patent: Dec. 5, 2017

(54) CONTROLLED AND MULTI-COLOR SCANNER ILLUMINATION

(71) Applicant: NCR Corporation, Duluth, GA (US)

(72) Inventor: John Crooks, Duluth, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/954,553

(22) Filed: Nov. 30, 2015

(65) Prior Publication Data
US 2017/0154254 A1   Jun. 1, 2017

(51) Int. Cl.
| | |
|---|---|
| G06K 7/10 | (2006.01) |
| G06K 19/06 | (2006.01) |
| G06Q 20/20 | (2012.01) |
| G06T 1/00 | (2006.01) |
| H04N 5/225 | (2006.01) |
| H04N 5/235 | (2006.01) |
| H04N 9/07 | (2006.01) |
| G06K 9/20 | (2006.01) |
| G06K 9/46 | (2006.01) |
| H04N 1/48 | (2006.01) |
| H04N 1/32 | (2006.01) |

(52) U.S. Cl.
CPC ..... *G06K 19/0614* (2013.01); *G06K 7/10732* (2013.01); *G06K 7/10861* (2013.01); *G06K 9/2018* (2013.01); *G06K 9/2036* (2013.01); *G06K 9/2063* (2013.01); *G06K 9/4652* (2013.01); *G06Q 20/208* (2013.01); *G06T 1/0021* (2013.01); *H04N 1/484* (2013.01); *H04N 5/2256* (2013.01); *H04N 5/2354* (2013.01); *H04N 9/07* (2013.01); *G06K 2209/17* (2013.01); *G06T 1/005* (2013.01); *G06T 2201/0065* (2013.01); *H04N 1/32149* (2013.01)

(58) Field of Classification Search
CPC .. G06K 7/10881; G06K 7/10851; G06K 7/12; G06K 9/228; G06K 19/06028; G06K 19/06046; G06K 19/06159; G06K 7/10722; G06K 7/10831; G06K 7/10841; G06K 7/1092; G06K 7/1096; G06K 7/1404; G06K 7/1413
USPC .............. 235/472.01–472.03, 462.01–462.25
See application file for complete search history.

(56) References Cited

U.S. PATENT DOCUMENTS

| | | | | |
|---|---|---|---|---|
| 6,164,782 | A * | 12/2000 | Pojar | ........................ F21V 5/02 359/527 |
| 6,363,366 | B1 | 3/2002 | Henty | |
| 8,058,815 | B1 * | 11/2011 | Hardy | ................ H05B 33/0842 315/291 |
| 9,082,029 | B2 | 7/2015 | Hammer | |
| 2005/0122422 | A1 * | 6/2005 | Kent | .................... H04N 5/2354 348/371 |

(Continued)

OTHER PUBLICATIONS

European Search Report issued in copending European Patent Application 16184089 dated Apr. 18, 2017.

*Primary Examiner* — Thien M Le
(74) *Attorney, Agent, or Firm* — Schwegman, Lundberg & Woessner

(57) ABSTRACT

A scanner camera is presented with a controller that selectively illuminates white and/or colored light sources, during each particular color illumination of an object being imaged, the camera captures a monochrome image of that particular color illuminated object. One or more of the images are processed by the controller to obtain information about the object being imaged.

20 Claims, 5 Drawing Sheets

(56) References Cited

U.S. PATENT DOCUMENTS

| | | | |
|---|---|---|---|
| 2006/0202036 A1* | 9/2006 | Wang | G06K 7/10722 235/462.07 |
| 2006/0202038 A1* | 9/2006 | Wang | G06K 7/10732 235/462.24 |
| 2008/0277473 A1* | 11/2008 | Kotlarsky | G06K 7/10722 235/462.07 |
| 2010/0213259 A1* | 8/2010 | Gao | G06K 7/10722 235/469 |
| 2012/0211555 A1* | 8/2012 | Rowe | G06K 7/1404 235/375 |
| 2013/0195273 A1* | 8/2013 | Lord | H04L 63/0428 380/270 |
| 2013/0329006 A1 | 12/2013 | Boles et al. | |
| 2014/0091147 A1* | 4/2014 | Evans | G06K 7/10881 235/472.02 |
| 2014/0333450 A1* | 11/2014 | Savage, Jr. | G08B 5/38 340/815.45 |
| 2015/0020588 A1* | 1/2015 | Larson | G01N 9/00 73/32 R |
| 2015/0156369 A1* | 6/2015 | Reed | H04N 1/32309 382/100 |
| 2016/0035201 A1* | 2/2016 | Savage, Jr. | G08B 5/38 340/815.45 |
| 2016/0051829 A1* | 2/2016 | Porat | A61N 5/062 600/26 |
| 2016/0305631 A1* | 10/2016 | Hansen | F21V 7/0083 |

* cited by examiner

CONTROLLED AND MULTI-COLOR SCANNER ILLUMINATION

BACKGROUND

Point-Of-Sale (POS) devices often include a variety of integrated devices, such as scanners, scales, integrated scanners with scales, card readers with on-screen signature capabilities, and the like.

Imaging scanners have advantages over laser scanners in that they can read two-dimensional (2D) symbols and are actually better at detecting some poor quality one-dimensional (1D) tags. However, to date imaging scanners are still relatively expensive when compared to laser scanners. This is largely due to the fact that scanners with cameras require multiple cameras (more than one) in order to view multiple sides of an object being scanned, which is a requirement for bioptic scanning.

However, recent watermarking techniques with packaging have made the need for multiple cameras less necessary. This is so because the barcode and other information can be watermarked into the entire product packaging and detected by a single camera that only images the product from one field of view, which may or may not have the original product barcode. The watermark is hidden from view. One issue with the watermark is that color is used to integrate dots throughout the packaging, such that monochrome scanner cameras with white illumination are unable to process and recognize the colored dot patterns used for watermarking the product information.

For example, Digimarc® is a popular product packaging watermarking technology. Digimarc® mostly relies on colored ink dots integrated into the packaging as product information. These colored ink dots are best viewed using red light. However, a color scanner is generally needed for recognizing the Digimarc® watermarks in a product's packaging. Most companies do not have a color scanner and upgrading to one can be expensive when companies can have tens or hundreds of thousands of scanners deployed throughout their retail stores.

However, there are still instances where monochrome scanners are desired with white illumination such as for security pictures and/or video recording by the scanner cameras. Moreover, customers and operators of the scanners actually prefer white light illumination from the scanners as opposed to red lights. It appears for whatever reasons people associated a negative connotation with red light; perhaps believing to be associated with radiation or for other reasons. Therefore, customers have been reluctant to adopt red-illumination scanners to read watermarks on packaging.

SUMMARY

In various embodiments, controlled and multi-colored scanning methods, a scanner, and a Point-Of-Sale (POS) terminal are provided.

According to an embodiment, a scanner for controlled and multi-colored scanning of product packaging is provided.

Specifically, the scanner includes at least one camera, at least one bank of illumination sources, and a controller. The controller is configured to selectively illuminate an object in front of the camera in different colors selected from the at least one bank of illumination sources and each illumination represent a particular unique color and for each illumination a separate image is captured by the camera and passed to the controller for image processing.

DETAILED DESCRIPTION

Figure 1A:
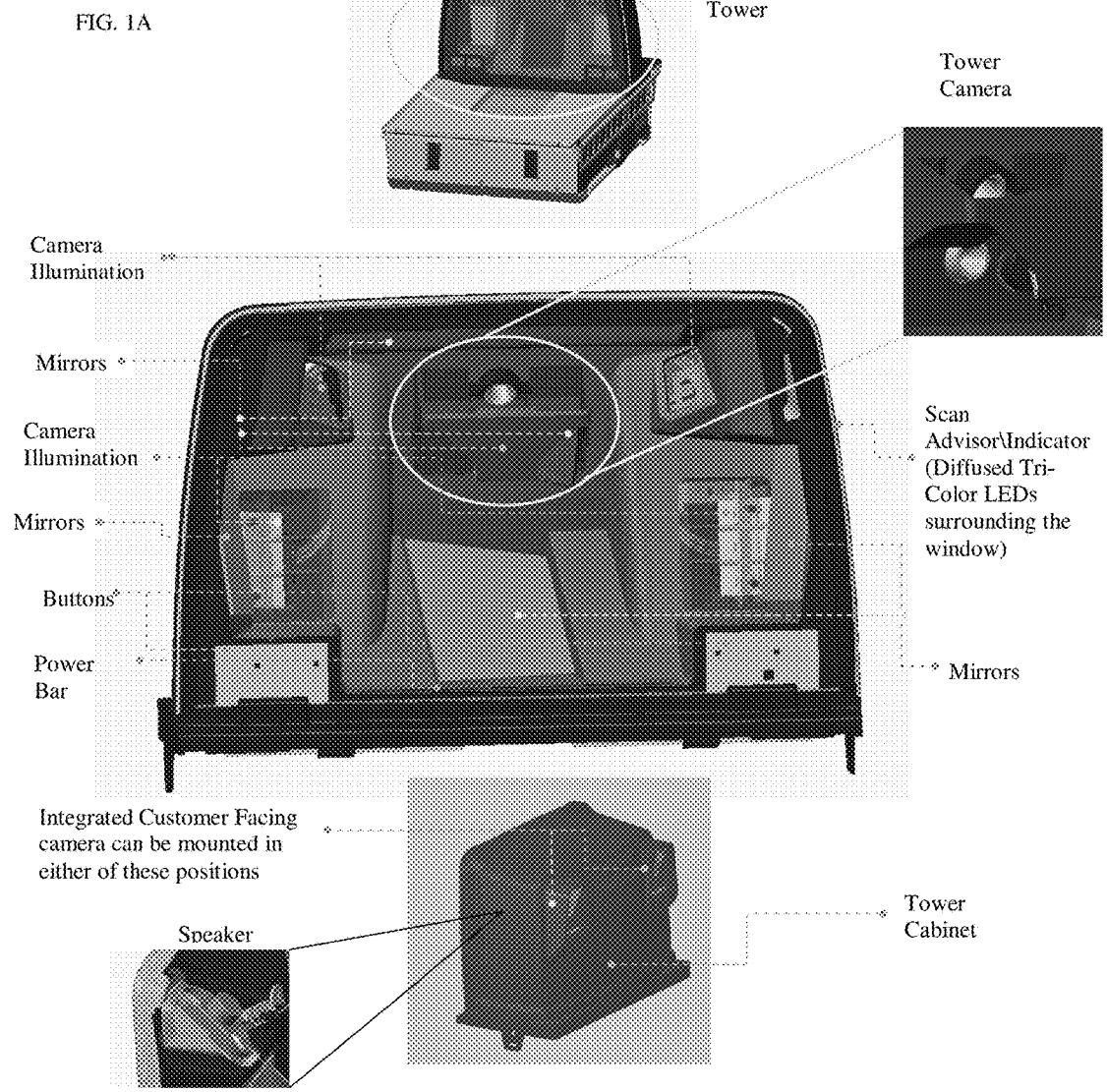
FIG. 1A is a diagram depicting various components of a multi-colored light illumination scanner, according to an example embodiment.

FIG. 1A is a diagram depicting various components of a multi-colored light illumination scanner, according to an example embodiment. It is to be noted that the configuration is shown schematically in greatly simplified form, with only those components relevant to understanding of this embodiment being illustrated.

FIG. 1A represent a vertical tower assembly that includes tower cabinetry, cameras, illumination sources, LED indicators, mirrors, buttons, power bar, and speakers.

The vertical tower assembly scanner also includes a controller (processor—not shown in the FIG. 1A (the controller depicted in the FIGS. 1C and 3 below).

The novel cameras illumination sources are a combination of independently controlled white LEDs and a combination of independently controlled colored LEDS. The controller selective activates the white and colored LEDs to create a strobing effect.

In an embodiment, the controller selectively activates each of the white LEDs and colored LEDS individually and, optionally, in a predefined order or pattern of activation.

In an embodiment, the controller selectively activates groups of the white and colored LEDS in groupings, and optionally, in a predefined order or pattern of activation.

In an embodiment, the LED groupings include white LEDs and red LEDs. The red illumination when activated permits the camera to take an image of product packaging passing in front of or placed in front of the camera to provide an image with red light only being captured. The image of the red light reflection permits watermarks (such as Digimarc®) to be identified in predefined sequences and or patterns that when processed by an image processing algorithm can decode the patterns to produce product information unique to the product that was imaged. In some cases, this product information is a Global Trade Item Number (GTIN) and may also include information that is typically available in a Universal Product Code (UPC) barcode for the product. The white light illumination when activated permits the camera to take a second image of the product packaging for purposes of capturing barcodes on the product packaging or capturing images and/or video (as discussed above). In this manner, the white and red separate and independent illumination permits multiple images with different reflected light information to be captured in separate images and processed by an image processing algorithm.

Each strobe of a light source (white or colored) results in a set of camera images, one for each of the cameras present in the scanner (such as four separate cameras), and each image illuminated or captured in a same or single strobe color (white or a specific color).

In an embodiment, the strobe rate and the camera frame rates are around 40 strobes per second.

In an embodiment, the strobe length is around 100 microseconds.

Moreover, because of the rate of the strobing between the white and colored LEDs, the net human perceived color of illumination seen coming from the scanner is white or close to white. However, in some instances it may be desirable to jump between patterns with different human perceptible colors, for example to scan-red denominated pattern for a watermarked package of a product (such as Digimarc® watermarks) to increase performance in imaging the watermarks on the package, and then to idle to white illumination with a white dominated pattern for customer perception (since customers tend to have negative connotations about red illumination, i.e., customers don't like red light).

In an embodiment, the image processing algorithm resides in the controller of the scanner. Once the images are captured they are passed to the controller and the image processing algorithm for processing. It is noted that different illuminations (resulting in different reflected light being imaged in each of the multiple images) work best for different kinds of desired image processing.

In an embodiment, to conserve and improve processing throughput of the controller when processing, the image processing algorithm may choose to perform processing on those images with a preferred illumination color.

For example, 1) 1D or 2D barcodes are processed by the controller using red or white illumination, 2) watermark encoding (such as Digimarc® watermarks) are processed by the controller using red illumination, 3) image analytics (such as ScanWatch® distributed by NCR, Inc.), and in particular with produce picklist reduction relies on being able to detect produce color, so the controller processes using white illumination, and 4) security video over a USB or Ethernet connection to the controller may be preferable processed using white illumination.

A variety of embodiments for processing selective and controlled white and color illumination with the scanner are now presented for further illustration of the beneficial teachings presented herein.

Sample Embodiment #1: White and Red LED Color Groups

The scanner has white and red LED color groups, and strobes those groups in the following example pattern: red-white-white-white (repeat). The human perceptible color emanating from the scanner is a "warm white." The red frames get image processing for 1D/2D barcodes and watermarked packages, such as Digimarc®. The white frames get image processing for 1D/2D barcodes (for example for ScanWatch®) and security video. This pattern favors 1D/2D barcodes and ScanWatch®-based applications.

An alternative pattern might be red-red-red-white (repeat). The human perceptible color emanating from the scanner is pink. This pattern favors watermarked packages (such as Digimarc®) and 1D/2D barcodes.

The scanner can alternatively switch between two patterns as necessary. For example, the scanner can switch between a red-red-red-red pattern for scanning, and a white-white-white-white pattern when produce is on the scale.

Embodiment #2: Red, Green, and Blue LED Color Groups

The scanner has red, green, and blue LED color groups, and strobes the groups in the following example pattern: red-RGB-RGB-RGB (repeat). RGB means red+green+blue, which makes white. Overall human perceptible color emanating from the scanner is a "warm white." This pattern favors 1D/2D barcodes and ScanWatch®.

An alternative pattern might be red-green-blue (repeat). Red frames get image processing for 1D/2D barcodes and watermarked packaging, such as Digimarc®. Green and blue frames get image processing for 1D/2D barcodes and ScanWatch®. An advantage of this arrangement is that a sequence of three frames can be combined to create a single color image, even though the scanner uses monochrome image sensors. This color image can be used for ScanWatch® picklist reduction and security video.

The scanner can alternatively switch between the above two patterns as necessary. For example red-RGB-RGB-RGB for scanning, and R-G-B when produce is on the scale.

Figure 1B:
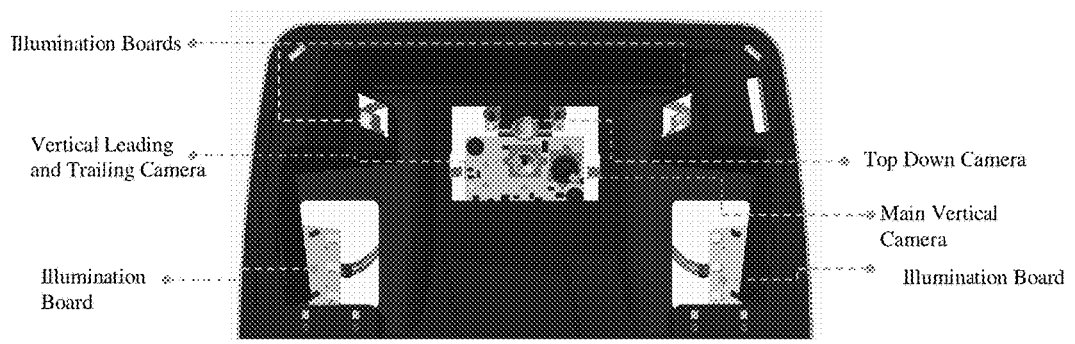
FIG. 1B is a diagram depicting various components of a tri-camera colored light illumination scanner, according to an example embodiment.

FIG. 1B is a diagram depicting various components of a tri-camera colored light illumination scanner, according to an example embodiment. The tri-camera includes 4 illumination boards and three cameras. The illumination boards can include white and/or colored LEDs (since RGB in equal intensities make white light). The various features and processing associated with the selective white and colored scanning illumination presented above with the scanner of the FIG. 1A can also be achieved with the vertical tri-camera scanner of the FIG. 1B utilizing the controller as discussed above with the FIG. 1A description.

These and other embodiments will now be discussed with reference to the FIGS. 1C and 2-3.

Figure 1C:
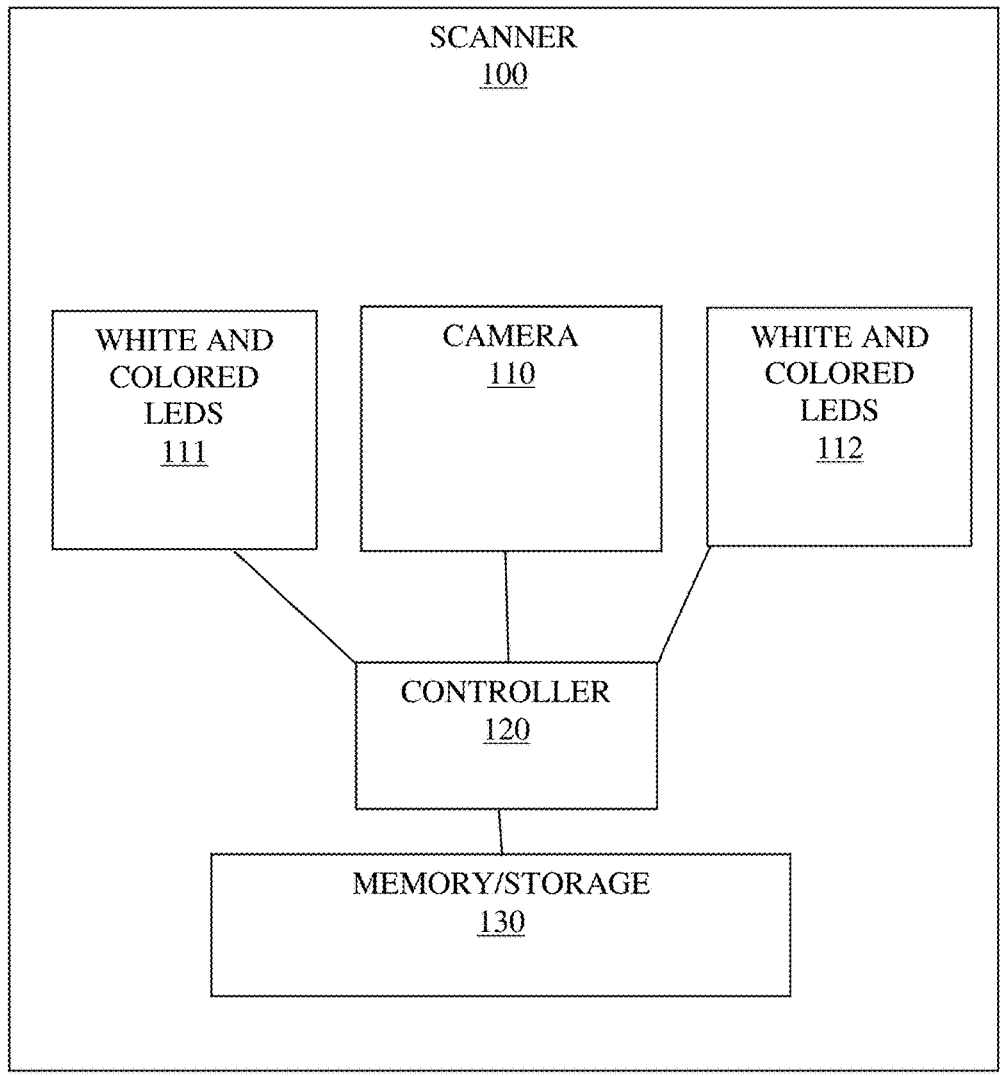
FIG. 1C is a diagram of a scanner having controlled white and multi-colored Light Emitting Diodes (LEDs), according to an example embodiment.

FIG. 1C is a diagram of a scanner 100 having controlled white and multi-colored Light Emitting Diodes (LEDs), according to an example embodiment. Again, FIG. 1C is shown in greatly simplified form with only those components necessary to understanding various embodiments of the scanner presented in FIG. 1C presented.

The scanner 100 includes at least one camera 110, at least one bank of white and/or colored LED illumination sources 111 and/or 112 (although two banks of white and/or colored LED illumination sources are shown in the FIG. 1C), a controller 120, and memory/storage.

In an embodiment, the scanner 100 is the scanner presented in the FIG. 1A.

In an embodiment, the scanner 100 is the scanner presented in the FIG. 1B.

The controller 120 drives preconfigured illumination of the white and/or colored LEDs 111 and/or 112, such that a single color is illuminated at one instant in time and during that same instant in time, the camera is driven by the controller 120 to capture a single image. The alternation between the single color illuminations are achieved through strobing the LEDs 111 and/or 112.

The strobing produces a human perceptible color of warm white or pink (as discussed above and depending on the predefined pattern and rate of the strobing). Thus, avoiding red color from being perceived and satisfying customer desires to avoid red illumination, although red images are captured when red LEDs are activated during a particular strobe.

It is also noted that although white is identified as an option with the white and colored LEDs 111 and/or 112, white LEDs do not have to be present since RGB can produce white when activated at the same time together to produce white light.

During red illumination the camera captures an image that reflects just red light and that image is passed to the controller 120 for image processing that is particularly relevant to detecting watermarked patterns in a package of a product being imaged by the scanner 100. The image processing algorithm resident in the controller 120 can then detect defined patterns of the watermarks to detect encoded product information for the product, such as UPC information or information equivalent to what would be in a barcode. Red light illumination may also be used for image processing of 1D and 2D barcodes affixed to the product packaging.

During white illumination the camera 110 captures an image that reflects all colors and that image is passed to the controller 120 for image processing that is particularly relevant to detecting video and image analytics. White light illumination may also be used for image processing of 1D and 2D barcodes affixed to the product packaging.

It is noted that the camera 110 includes a monochrome sensor, which reduces the cost associated with the camera itself and yet the various colors associated with the scan images can be captured through the strobing illumination of the individual colors and capturing by the monochrome sensor of the camera 110 of separate images for each of the individual colors as discussed above with reference to the FIG. 1A.

The memory/storage 130 may be used by the controller 120 to manage the series of images and to decide which images should be processed by the image processing algorithm for optimal processing throughput of the controller 120 as was discussed above with reference to the FIG. 1A.

In an embodiment, the controller 120 is the controller discussed above with reference to the FIG. 1A.

In an embodiment, the scanner 100 is integrated into or interfaced to a POS terminal. In an embodiment, the POS terminal is a cashier-assisted terminal. In an embodiment, the POS terminal is a self-service terminal.

Figure 2:
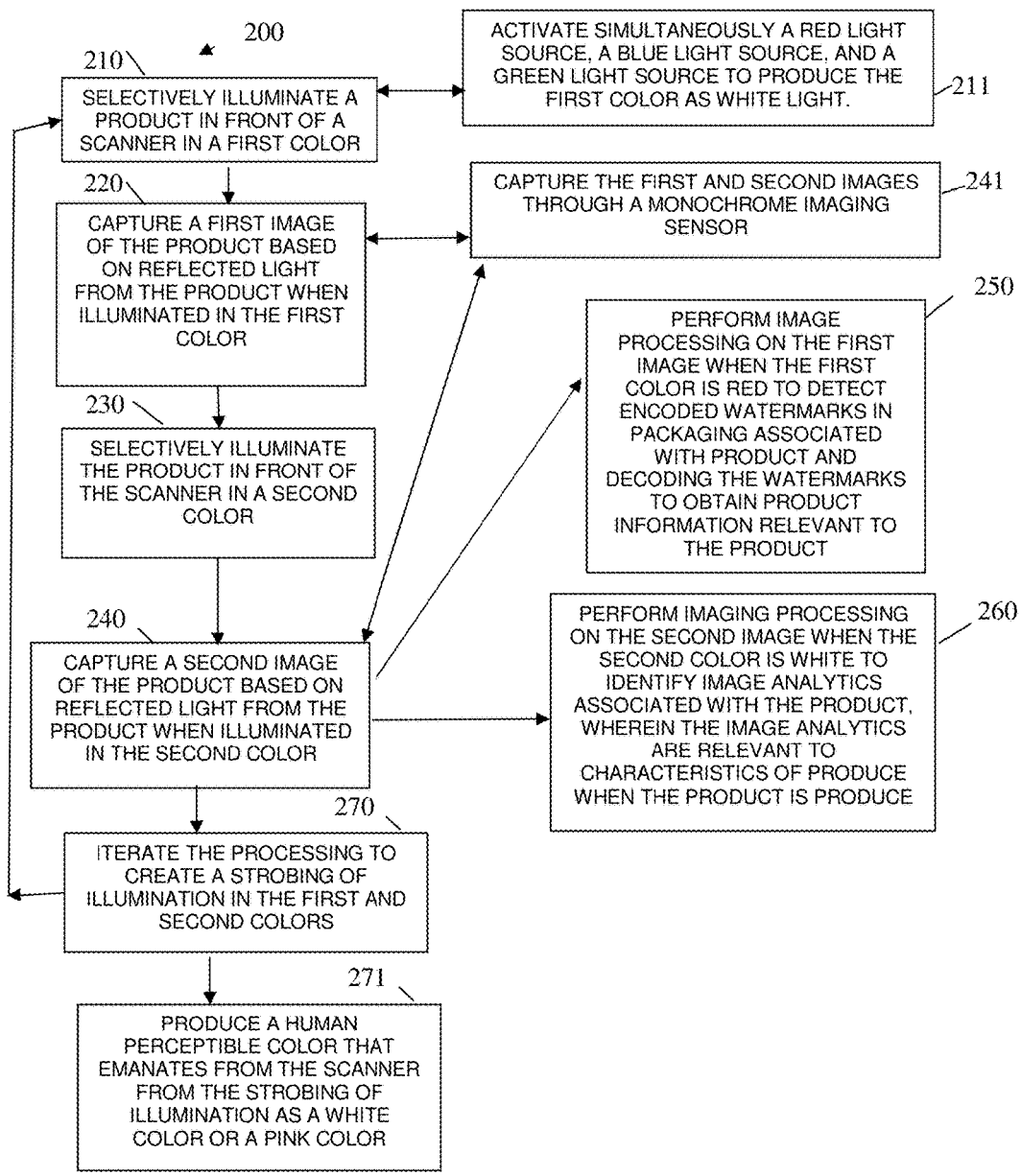
FIG. 2 is a diagram of a method for controlled multi-color scanning of product packaging, according to an example embodiment.

FIG. 2 is a diagram of a method 200 for controlled multi-color scanning of product packaging, according to an example embodiment. The method 200 (hereinafter "scan illumination manager") is implemented as one or more software modules (executable instructions) that are executed by a special purpose device configured to execute the scan illumination manager. The scan illumination manager may or may not have access to one or more networks, which may be wired, wireless, or a combination of wired and wireless.

In an embodiment, the special purpose device that executes the scan illumination manager is the controller 120 of the FIG. 1C.

In an embodiment, the special purpose device that executes the scan illumination manager is the controller discussed above with reference to the FIG. 1A.

At 210, the scan illumination manager selectively illuminates a product in front of a scanner a first color.

In an embodiment, at 211, the scan illumination manager activates simultaneously a red light source, a blue light source, and a green light source to produce the first color as white light.

At 220, the scan illumination manager captures the first image of the product based on reflected light from the product when illuminated in the first color.

At 230, the scan illumination manager selectively illuminates the product in front of the scanner in a second color.

At 240, the scan illumination manager captures a second image of the product based on reflected light from the product when illuminated in the second color.

According to an embodiment of 220 and 240 at 241, the scan illumination manager captures the first and second images through a monochrome imagining sensor.

In an embodiment, at 250, the scan illumination manager performs image processing on the first image when the first color is red to detect encoded watermarks in packaging associated with the product. The scan illumination manager then decodes the watermarks to obtain product information relevant to the product.

In an embodiment, at 260, the scan illumination manager performs image processing on the second image when the second color is white to identify image analytics associated with the product. The image analytics are relevant to characteristics of product when the product is produce.

In an embodiment, at 270, the scan illumination manager iterates back to the processing at 210 to create a strobing of illumination in the first and second colors.

According to an embodiment of 270 and at 271, the scan illumination manager produces a human perceptible color that emanates from the scanner from the strobing of illumination as a white color or a pink color.

Figure 3:
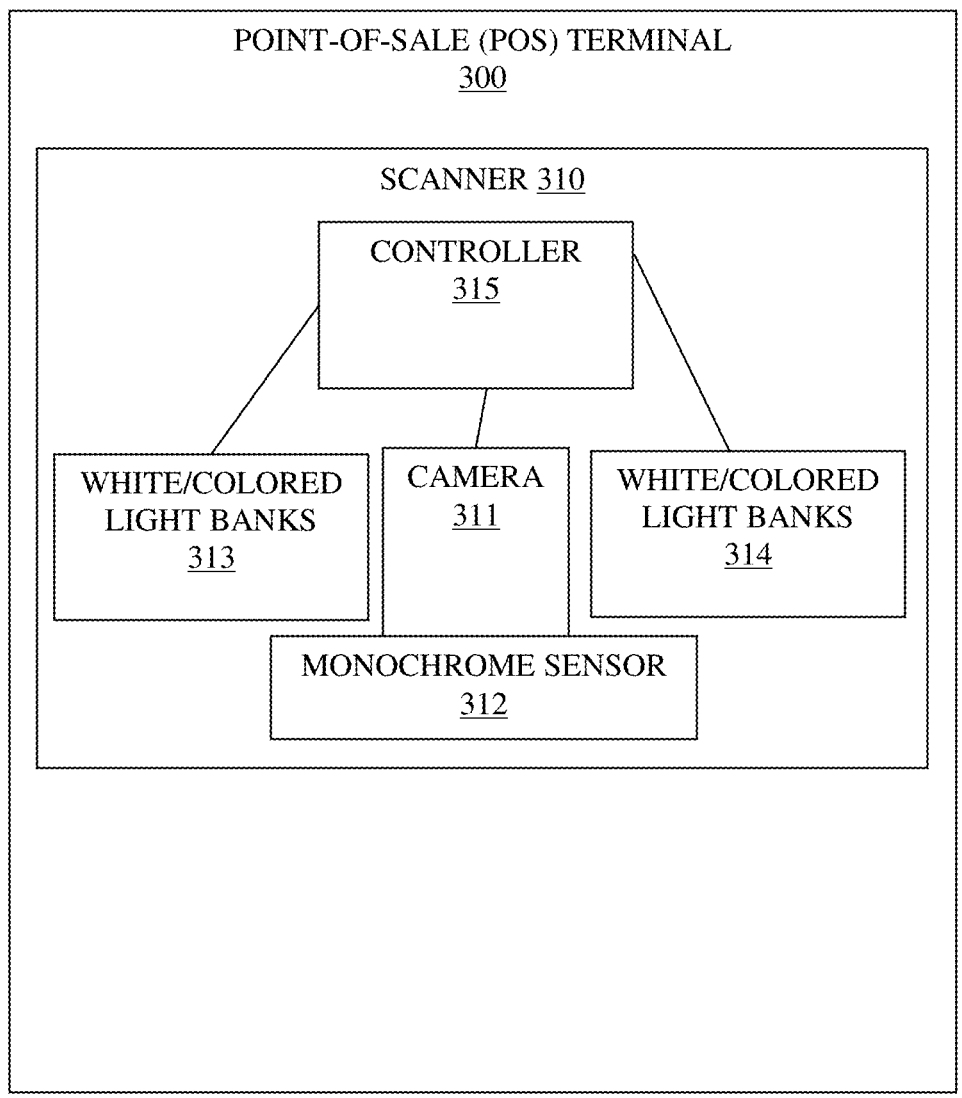
FIG. 3 is a diagram of POS terminal having a controlled multi-color illumination scanner, according to an example embodiment.

FIG. 3 is a diagram of POS terminal 300 having a controlled multi-color illumination scanner 310, according to an example embodiment. The POS terminal 300 includes a variety of hardware and software components. The software components are implemented as executable instructions and are processed by a special purpose controller 415 configured to specifically process the executable instructions. The POS terminal has access to one or more networks, which may be wired, wireless, or a combination of wired and wireless.

In an embodiment, the POS terminal 300 is a cashier-assisted terminal.

In an embodiment, the POS terminal 300 is a self-service kiosk.

In an embodiment, the scanner 310 is the scanner presented in the FIG. 1A.

In an embodiment, the scanner 310 is the scanner presented in the FIG. 1B.

In an embodiment, the scanner 310 is the scanner 100 of the FIG. 1C.

In an embodiment, the scanner 310 is the scanner discussed with the FIG. 2.

In an embodiment, the controller 315 is the controller discussed with the FIG. 1A.

In an embodiment, the controller 315 is the controller 120 of the FIG. 1C.

In an embodiment, the controller 315 is the controller discussed with reference to the FIG. 2.

The POS terminal 300 includes an integrated or interfaced scanner 310. The scanner 310 includes at least one camera 311 having a monochrome imaging sensor 312. The scanner 310 also includes at least one set of white and/or colored light banks 313 and/or 314 for illuminating items being imaged by the camera 311 through the monochrome imaging sensor 312. The scanner 310 also includes a controller 315.

The controller 315 is configured to: 1) strobe different color illuminations against an object selected from the at least one colored light bank 313 and/or 314, 2) activate the at least one camera 311 during each strobe illumination for the monochrome sensor 312 to take an image of the object, and 3) selectively process at least one image to obtain object information for the object.

In an embodiment, the controller 315 is further configured to identify watermark patterns from the object information that represents a GTIN for the object.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A scanner, comprising:
   at least one camera including a monochrome imaging sensor;
   at least one bank of illumination sources; and
   a controller,
   wherein the controller is configured to selectively illuminate an object in front of the camera in different colors selected from the at least one bank of illumination sources and each illumination represents a particular unique color and for each illumination a separate image is captured by the camera and passed to the controller for image processing;
   wherein one of the illuminations represents a red color that results in a corresponding image containing a marking represented by colored ink dots on the object that is encoded information for the product and the marking is not otherwise capturable by the monochrome imaging sensor with a different color alone, and wherein a visible emitted color from the illuminations is a non-red color.

2. The scanner of claim 1, wherein the marking comprises a watermark.

3. The scanner of claim 1, wherein the at least one bank of illumination sources include one or more white Light Emitting Diodes (LEDs) and one or more red LEDS.

4. The scanner of claim 1, wherein the at least one bank of illumination sources include one or more red Light Emitting Diodes (LEDS), one or more blue LEDS, and one or more green LEDS.

5. The scanner of claim 4, wherein the controller is configured to simultaneously activate the red LEDS, the blue LEDS, and the green LEDS during a single illumination to produce white illumination on the object.

6. The scanner of claim 1, wherein controller is configured to strobe the illuminations to produce a human perceptible color emanating from the scanner as white light or pink light.

7. The scanner of claim 6, wherein the controller is configured to strobe the illuminations at a rate of about 40 strobes per second.

8. The scanner of claim 7, wherein the controller is configured to hold a length for each strobe at a rate of about 100 microseconds.

9. The scanner of claim 8, wherein the controller is configured to activate the camera to capture an image of the object during each strobe.

10. The scanner of claim 1, wherein the controller is configured to one or more of: i) activate groupings of the illumination sources from the at least one bank of illumination sources during each illumination, ii) dynamically switch from one color illumination selected from the at least one bank illumination sources to a selected different color illumination from the at least one bank of illumination sources.

11. A method, comprising:
    selectively illuminating a product in front of a scanner in a first color;
    capturing a first image of the product based on reflected light from the product when illuminated in the first color by a monochrome camera, wherein the first image contains a marking represented by colored ink dots on the product that is encoded information for the product and the marking is not otherwise capturable by a monochrome imaging sensor with a different color alone;
    selectively illuminating the product in front of the scanner in a second color; and
    capturing a second image of the product based on reflected light from the product when illuminated in the second color by the monochrome camera, and emitting one or more visible colors during the illuminating of the product in the first color and second color that are not in the first color.

12. The method of claim 11 further comprising, performing image processing on the first image when the first color is red to detect encoded watermarks in packaging associated with product and decoding the watermarks to obtain product information relevant to the product.

13. The method of claim 11 further comprising, performing imaging processing on the second image when the second color is white to identify image analytics associated with the product, wherein the image analytics are relevant to characteristics of produce when the product is produce.

14. The method of claim 11 further comprising, iterating the processing of the method to create a strobing of illumination in the first and second colors.

15. The method of claim 14, wherein iterating further includes producing a human perceptible color that emanates from the scanner from the strobing of illumination as a white color or a pink color.

16. The method of claim 11, wherein selectively illuminating the product in the first color further includes activating simultaneously a red light source, a blue light source, and a green light source to produce the first color as white light.

17. The method of claim 11, wherein capturing the first image and capturing the second image further includes capturing the first and second images through a monochrome imaging sensor.

18. A Point-Of-Sale (POS) terminal, comprising:
    a scanner;
    a camera having a monochrome imaging sensor;
    at least one colored light bank; and
    a controller,
    wherein the controller is configured to: i) strobe different color illuminations against an object selected from the at least one colored light bank, ii) activate the camera during each strobe illumination for the monochrome imaging sensor to take an image of the object, and iii) selective process at least one image to obtain object information for the object;

wherein one of the strobe illuminations represents a red color that results in a corresponding image containing a marking on the object represented by color ink dots on the object that is encoded information for the object and the marking is not otherwise capturable by the monochrome imaging sensor with white light alone and emitting during the illuminations one or more visible colors that are not the red color.

19. The POS terminal of claim 18, wherein the POS terminal is one of: a cashier assisted terminal and a self-service terminal.

20. The POS terminal of claim 18, wherein the controller is further configured, in iii), to: identify watermark patterns from the object information that represents a Global Trade Item Number (GTIN) for the object.

* * * * *